US010853272B2

(12) United States Patent
Garg et al.

(10) Patent No.: US 10,853,272 B2
(45) Date of Patent: *Dec. 1, 2020

(54) MEMORY ACCESS PROTECTION APPARATUS AND METHODS FOR MEMORY MAPPED ACCESS BETWEEN INDEPENDENTLY OPERABLE PROCESSORS

(71) Applicant: Apple Inc., Cupertino, CA (US)

(72) Inventors: Saurabh Garg, Cupertino, CA (US); Karan Sanghi, Cupertino, CA (US); Vladislav Petkov, Cupertino, CA (US); Haining Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,543

(22) Filed: Jan. 28, 2019

(65) Prior Publication Data

US 2019/0155757 A1    May 23, 2019

Related U.S. Application Data

(62) Division of application No. 15/271,102, filed on Sep. 20, 2016, now Pat. No. 10,198,364.

(60) Provisional application No. 62/316,326, filed on Mar. 31, 2016.

(51) Int. Cl.
*G06F 12/14* (2006.01)
*G06F 12/1081* (2016.01)

(52) U.S. Cl.
CPC ...... *G06F 12/1441* (2013.01); *G06F 12/1081* (2013.01); *G06F 2212/1052* (2013.01)

(58) Field of Classification Search
CPC ............ G06F 12/1441; G06F 12/1081; G06F 2212/1052
See application file for complete search history.

(56) References Cited

U.S. PATENT DOCUMENTS

| 4,805,137 A | 2/1989 | Grant et al. |
| 4,949,299 A | 8/1990 | Pickett |
| 4,987,529 A | 1/1991 | Craft et al. |

(Continued)

FOREIGN PATENT DOCUMENTS

| EP | 3013008 A1 | 4/2016 |
| JP | H02306082 A | 12/1990 |

(Continued)

OTHER PUBLICATIONS

ECN L1 PM Substates with CLKREQ approved Aug. 23, 2012.

(Continued)

*Primary Examiner* — Tasnima Matin
(74) *Attorney, Agent, or Firm* — Gazdzinski & Associates, PC

(57) ABSTRACT

Methods and apparatus for registering and handling access violations of host memory. In one embodiment, a peripheral processor receives one or more window registers defining an extent of address space accessible from a host processor; responsive to an attempt to access an extent of address space outside of the extent of accessible address space, generates an error message; stores the error message within a violation register; and resumes operation of the peripheral processor upon clearance of the stored error message.

20 Claims, 6 Drawing Sheets

(56) References Cited

U.S. PATENT DOCUMENTS

| | | |
|---|---|---|
| 5,367,688 A | 11/1994 | Croll |
| 5,467,459 A | 11/1995 | Alexander et al. |
| 5,485,578 A | 1/1996 | Sweazey |
| 5,613,086 A | 3/1997 | Frey et al. |
| 5,659,542 A | 8/1997 | Bell et al. |
| 5,708,779 A | 1/1998 | Graziano et al. |
| 5,731,973 A | 3/1998 | Takaishi et al. |
| 5,850,395 A | 12/1998 | Hauser et al. |
| 5,903,564 A | 5/1999 | Ganmukhi et al. |
| 5,943,507 A | 8/1999 | Cornish et al. |
| 6,008,992 A | 12/1999 | Kawakami |
| 6,212,566 B1 | 4/2001 | Vanhoof et al. |
| 6,216,178 B1 | 4/2001 | Stracovsky et al. |
| 6,233,702 B1 | 5/2001 | Bunton et al. |
| 6,260,152 B1 | 7/2001 | Cole et al. |
| 6,359,863 B1 | 3/2002 | Varma et al. |
| 6,411,997 B1 | 6/2002 | Dawes et al. |
| 6,434,633 B1 | 8/2002 | Braun et al. |
| 6,466,898 B1 | 10/2002 | Chan |
| 6,485,081 B1 | 11/2002 | Bingle et al. |
| 6,523,073 B1 | 2/2003 | Kammer et al. |
| 6,553,446 B1 | 4/2003 | Miller |
| 6,693,895 B1 | 2/2004 | Crummey et al. |
| 6,735,642 B2 | 5/2004 | Kagan et al. |
| 6,815,873 B2 | 11/2004 | Johnson et al. |
| 6,947,442 B1 | 9/2005 | Sato et al. |
| 6,948,094 B2 | 9/2005 | Schultz et al. |
| 6,973,701 B2 | 12/2005 | Momoda et al. |
| 6,990,594 B2 | 1/2006 | Kim et al. |
| 7,013,536 B2 | 3/2006 | Golden et al. |
| 7,032,282 B2 | 4/2006 | Powell et al. |
| 7,099,949 B1 | 8/2006 | Vanhoof et al. |
| 7,100,020 B1 | 8/2006 | Brightman et al. |
| 7,127,600 B2 | 10/2006 | Zimmer et al. |
| 7,159,221 B1 | 1/2007 | Willen et al. |
| 7,191,240 B1 | 3/2007 | Johnson |
| 7,281,172 B2 | 10/2007 | Chujo |
| 7,397,774 B1 | 7/2008 | Holland et al. |
| 7,398,382 B2 | 7/2008 | Rothman et al. |
| 7,506,084 B2 | 3/2009 | Moerti et al. |
| 7,509,391 B1 | 3/2009 | Chauvel et al. |
| 7,587,575 B2 | 9/2009 | Moertl et al. |
| 7,590,817 B2 | 9/2009 | Moertl et al. |
| 7,617,377 B2 | 11/2009 | Moertl et al. |
| 7,681,012 B2 | 3/2010 | Verm et al. |
| 7,685,476 B2 | 3/2010 | Andre et al. |
| 7,802,256 B2 | 9/2010 | Havens et al. |
| 7,813,366 B2 | 10/2010 | Freimuth et al. |
| 7,853,731 B1 | 12/2010 | Zeng |
| 7,864,720 B2 | 1/2011 | Jeyaseelan |
| 7,899,941 B2 | 3/2011 | Hendry et al. |
| 7,908,335 B1 | 3/2011 | Citterelle et al. |
| 7,941,682 B2 | 5/2011 | Adams |
| 7,957,777 B1 | 6/2011 | Vu et al. |
| 8,230,248 B2 | 7/2012 | Dance et al. |
| 8,255,725 B2 | 8/2012 | Shimazaki et al. |
| 8,310,965 B1 | 11/2012 | Zhang et al. |
| 8,352,624 B2 | 1/2013 | Zimmerman et al. |
| 8,359,449 B2 | 1/2013 | Accapadi et al. |
| 8,422,404 B2 | 4/2013 | Taki |
| 8,468,285 B2 | 6/2013 | Kobayashi |
| 8,555,099 B2 | 10/2013 | Marinkovic et al. |
| 8,600,820 B2 | 12/2013 | Hoffman |
| 8,635,412 B1 | 1/2014 | Wilshire |
| 8,656,228 B2 | 2/2014 | Check et al. |
| 8,756,601 B2 | 6/2014 | Plondke et al. |
| 8,769,168 B2 | 7/2014 | Moertl et al. |
| 8,788,822 B2 | 7/2014 | Riddle |
| 8,799,537 B1 | 8/2014 | Zhu et al. |
| 8,808,091 B2 | 8/2014 | Shaw et al. |
| 8,819,386 B1 | 8/2014 | Mather |
| 8,832,331 B2 | 9/2014 | Co |
| 8,848,809 B2 | 9/2014 | Whitby-Strevens |
| 8,876,062 B1 | 11/2014 | Baghdasarian |
| 8,914,649 B2 | 12/2014 | So et al. |
| 9,152,580 B1 | 10/2015 | Chau et al. |
| 9,170,957 B2 | 10/2015 | Touzni et al. |
| 9,280,360 B2 | 3/2016 | Xu et al. |
| 9,319,090 B2 | 4/2016 | Whitby-Strevens |
| 9,356,844 B2 | 5/2016 | Kim et al. |
| 9,544,069 B2 | 1/2017 | Whitby-Strevens et al. |
| 9,547,535 B2 | 1/2017 | Wilt |
| 9,568,970 B1 | 2/2017 | Kaushal et al. |
| 9,582,448 B2 | 2/2017 | Saitou |
| 9,594,718 B2 | 3/2017 | Kaushik et al. |
| 9,628,211 B1 | 4/2017 | Stoler et al. |
| 9,769,756 B1 | 9/2017 | Cui et al. |
| 9,830,289 B2 | 11/2017 | Pulyala et al. |
| 9,910,475 B2 | 3/2018 | Kurts et al. |
| 9,913,305 B2 | 3/2018 | Pinheiro et al. |
| 9,932,757 B2 | 4/2018 | Hager et al. |
| 9,946,325 B2 | 4/2018 | Leucht-Roth et al. |
| 9,959,124 B1 | 5/2018 | Herbeck et al. |
| 10,078,361 B2 | 9/2018 | Sanghi et al. |
| 2002/0013868 A1 | 1/2002 | West |
| 2002/0044553 A1 | 4/2002 | Chakravorty |
| 2002/0065867 A1 | 5/2002 | Chauvel |
| 2002/0169938 A1 | 11/2002 | Scott et al. |
| 2002/0195177 A1 | 12/2002 | Hinkley et al. |
| 2003/0014607 A1 | 1/2003 | Slavin et al. |
| 2003/0086122 A1 | 5/2003 | Parry |
| 2003/0099221 A1 | 5/2003 | Rhee |
| 2003/0112758 A1 | 6/2003 | Pang et al. |
| 2003/0200413 A1 | 10/2003 | Gurumoorthy et al. |
| 2004/0044929 A1 | 3/2004 | Chujo |
| 2004/0064589 A1 | 4/2004 | Boucher et al. |
| 2004/0128568 A1 | 7/2004 | O'Shea |
| 2004/0179546 A1 | 9/2004 | McDaniel et al. |
| 2004/0201749 A1 | 10/2004 | Malloy |
| 2004/0221056 A1 | 11/2004 | Kobayashi |
| 2004/0228365 A1 | 11/2004 | Kobayashi |
| 2004/0268172 A1 | 12/2004 | Kates et al. |
| 2005/0033947 A1 | 2/2005 | Morris et al. |
| 2005/0047356 A1 | 3/2005 | Fujii et al. |
| 2005/0076196 A1 | 4/2005 | Zimmer et al. |
| 2005/0108385 A1 | 5/2005 | Wechter et al. |
| 2005/0114620 A1 | 5/2005 | Justen |
| 2005/0117601 A1 | 6/2005 | Anderson et al. |
| 2005/0149711 A1 | 7/2005 | Zimmer et al. |
| 2005/0157781 A1 | 7/2005 | Ho et al. |
| 2005/0198777 A1 | 9/2005 | Mabe |
| 2005/0285862 A1 | 12/2005 | Noda et al. |
| 2006/0039285 A1 | 2/2006 | Chapman et al. |
| 2006/0047989 A1 | 3/2006 | Delgado et al. |
| 2006/0075269 A1 | 4/2006 | Liong et al. |
| 2006/0107071 A1 | 5/2006 | Girish et al. |
| 2006/0186700 A1 | 8/2006 | Browne et al. |
| 2006/0186706 A1 | 8/2006 | Browne et al. |
| 2006/0218301 A1 | 9/2006 | O'Toole et al. |
| 2006/0232051 A1 | 10/2006 | Morris et al. |
| 2007/0005869 A1 | 1/2007 | Balraj et al. |
| 2007/0043901 A1 | 2/2007 | Wu et al. |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0118831 A1 | 5/2007 | Kondo |
| 2007/0180041 A1 | 8/2007 | Suzuoki |
| 2007/0201492 A1 | 8/2007 | Kobayashi |
| 2007/0226417 A1 | 9/2007 | Davis |
| 2007/0261307 A1 | 11/2007 | Alexander et al. |
| 2007/0286246 A1 | 12/2007 | Kobayashi et al. |
| 2008/0007081 A1 | 1/2008 | Shibata et al. |
| 2008/0010563 A1 | 1/2008 | Nishimura |
| 2008/0046689 A1 | 2/2008 | Chen et al. |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0183931 A1 | 7/2008 | Verm et al. |
| 2008/0218225 A1 | 9/2008 | Shibayama |
| 2008/0231711 A1 | 9/2008 | Glen et al. |
| 2008/0235355 A1 | 9/2008 | Spanier et al. |
| 2008/0244259 A1 | 10/2008 | Zimmer et al. |

(56) References Cited

U.S. PATENT DOCUMENTS

| | | |
|---|---|---|
| 2008/0301148 A1 | 12/2008 | Lee et al. |
| 2009/0024924 A1 | 1/2009 | Kim |
| 2009/0083560 A1 | 3/2009 | O'Connell et al. |
| 2009/0109230 A1 | 4/2009 | Miller et al. |
| 2009/0113141 A1 | 4/2009 | Bullman et al. |
| 2009/0133016 A1 | 5/2009 | Brown et al. |
| 2009/0138650 A1 | 5/2009 | Lin et al. |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0282050 A1 | 11/2009 | Thomas et al. |
| 2009/0282088 A1 | 11/2009 | Thomas et al. |
| 2009/0310618 A1 | 12/2009 | Carter |
| 2009/0322531 A1 | 12/2009 | Estevez et al. |
| 2010/0017655 A1 | 1/2010 | Gooding et al. |
| 2010/0027729 A1 | 2/2010 | Murphy et al. |
| 2010/0030932 A1 | 2/2010 | Ergas et al. |
| 2010/0082859 A1 | 4/2010 | Hendry et al. |
| 2010/0097931 A1 | 4/2010 | Mustafa |
| 2010/0098419 A1 | 4/2010 | Levy et al. |
| 2010/0161959 A1 | 6/2010 | Sood |
| 2010/0329319 A1 | 12/2010 | Dai et al. |
| 2011/0022859 A1 | 1/2011 | More et al. |
| 2011/0029696 A1 | 2/2011 | Uehara |
| 2011/0035575 A1 | 2/2011 | Kwon et al. |
| 2011/0052142 A1 | 3/2011 | Sultenfuss et al. |
| 2011/0083002 A1 | 4/2011 | Albers et al. |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0017063 A1 | 1/2012 | Hummel et al. |
| 2012/0066523 A1 | 3/2012 | Kobayashi |
| 2012/0072658 A1 | 3/2012 | Hashimoto et al. |
| 2012/0084483 A1 | 4/2012 | Sanjive |
| 2012/0084484 A1 | 4/2012 | Post et al. |
| 2012/0102307 A1 | 4/2012 | Wong |
| 2012/0120959 A1* | 5/2012 | Krause ............ G06F 15/17381 370/392 |
| 2012/0124252 A1 | 5/2012 | Kayama et al. |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0091772 A1 | 4/2013 | Berger et al. |
| 2013/0124895 A1 | 5/2013 | Saha et al. |
| 2013/0138840 A1 | 5/2013 | Kegel et al. |
| 2013/0162911 A1 | 6/2013 | Glen |
| 2013/0173950 A1 | 7/2013 | Banerjea |
| 2013/0188544 A1 | 7/2013 | Tiwari et al. |
| 2013/0290947 A1 | 10/2013 | Li |
| 2014/0033220 A1 | 1/2014 | Campbell et al. |
| 2014/0052976 A1 | 2/2014 | Marino et al. |
| 2014/0082242 A1 | 3/2014 | Murphy et al. |
| 2014/0122828 A1 | 5/2014 | Kagan et al. |
| 2014/0173236 A1 | 6/2014 | Kegel |
| 2014/0189057 A1 | 7/2014 | Sankoda et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2014/0247983 A1 | 9/2014 | MacInnis et al. |
| 2014/0372656 A1 | 12/2014 | Sakurai et al. |
| 2015/0036051 A1 | 2/2015 | Broberg et al. |
| 2015/0189109 A1 | 7/2015 | Whitby-Strevens |
| 2015/0205749 A1 | 7/2015 | Whitby-Strevens et al. |
| 2015/0212806 A1 | 7/2015 | Hsieh |
| 2015/0293873 A1 | 10/2015 | Shao et al. |
| 2015/0293875 A1 | 10/2015 | Sala et al. |
| 2015/0309650 A1 | 10/2015 | Ahmed et al. |
| 2015/0309940 A1 | 10/2015 | Kumar et al. |
| 2015/0378737 A1 | 12/2015 | Debbage et al. |
| 2016/0034195 A1 | 2/2016 | Li et al. |
| 2016/0041852 A1 | 2/2016 | Suarez et al. |
| 2016/0070323 A1 | 3/2016 | Patil et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0179157 A1 | 6/2016 | Ardanaz et al. |
| 2016/0191400 A1 | 6/2016 | Sreeramoju |
| 2016/0208539 A1 | 7/2016 | Hofmann et al. |
| 2016/0224097 A1 | 8/2016 | Hirouchi |
| 2016/0224442 A1 | 8/2016 | Sanghi et al. |
| 2016/0266633 A1 | 9/2016 | Rabii |
| 2016/0269991 A1 | 9/2016 | Van et al. |
| 2016/0299860 A1 | 10/2016 | Harriman |
| 2016/0363955 A1 | 12/2016 | Stevens et al. |
| 2016/0364350 A1 | 12/2016 | Sanghi et al. |
| 2017/0026975 A1 | 1/2017 | Maric et al. |
| 2017/0089641 A1 | 3/2017 | Humfeld et al. |
| 2017/0108912 A1 | 4/2017 | Li et al. |
| 2017/0177222 A1 | 6/2017 | Singh et al. |
| 2017/0222943 A1 | 8/2017 | Yao et al. |
| 2017/0228481 A1 | 8/2017 | Pusuluri et al. |
| 2017/0249098 A1 | 8/2017 | Petkov et al. |
| 2017/0249164 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2017/0325124 A1 | 11/2017 | Mitra |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0073011 A1 | 3/2019 | Paterson et al. |

FOREIGN PATENT DOCUMENTS

| | | |
|---|---|---|
| JP | H03169996 A | 7/1991 |
| JP | 2004086792 A | 3/2004 |
| JP | 2012108677 A | 6/2012 |
| JP | 2013246642 A | 12/2013 |
| JP | 2015001867 A | 1/2015 |
| KR | 20150041072 A | 4/2015 |
| KR | 20150079788 A | 7/2015 |
| WO | WO-2008070138 A2 | 6/2008 |

OTHER PUBLICATIONS

Jackson, "PCI Express Technology", Sep. 2012 (Sep. 2012), MindShare Press, XP002777351, pp. 49,86,87,712-723.

PCI Express base Specification Revision 3.0, published Nov. 10, 2010.

PCI Express Base Specification Revision 3.1, published Oct. 8, 2014.

Universal Serial Bus, Communication Class, Subclass Specifications for Network Control Model (NCM) Devices; Revision 1.0 (Errata 1), Nov. 24, 2010, published by USB Implementers Forum, Inc.

Example of System Topology, Principle and System Structure of PCI, PCI-X and PCI Express, Mingjin Ma, Apr. 30, 2007.

* cited by examiner

MEMORY ACCESS PROTECTION APPARATUS AND METHODS FOR MEMORY MAPPED ACCESS BETWEEN INDEPENDENTLY OPERABLE PROCESSORS

PRIORITY

This application is a divisional of and claims the benefit of priority to U.S. patent application Ser. No. 15/271,102 filed Sep. 20, 2016 and entitled "MEMORY ACCESS PROTECTION APPARATUS AND METHODS FOR MEMORY MAPPED ACCESS BETWEEN INDEPENDENTLY OPERABLE PROCESSORS", which claims the benefit of priority to U.S. Provisional Patent Application Ser. No. 62/316,326 filed Mar. 31, 2016 and entitled "MEMORY ACCESS PROTECTION APPARATUS AND METHODS", each of the foregoing being incorporated herein by reference in its entirety.

RELATED APPLICATIONS

This application is related to commonly owned U.S. patent application Ser. No. 15/271,109 filed on Sep. 20, 2016 and entitled "MEMORY ACCESS PROTECTION APPARATUS AND METHODS FOR MEMORY MAPPED ACCESS BETWEEN INDEPENDENTLY OPERABLE PROCESSORS", the contents of which are incorporated herein by reference in their entirety.

This application is also related to commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015, Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015, Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNICAL FIELD

The disclosure relates generally to the field of electronics devices, as well as networks thereof. More particularly, in one exemplary aspect, the disclosure is directed to methods and apparatus for memory access protection between processors with shared memory resources.

2. DESCRIPTION OF RELATED TECHNOLOGY

The consumer electronics industry continuously strives to meet consumer demands for increased device functionality. In order to keep costs low and maximize supply chain diversity, most manufacturers design their consumer electronics devices to be constructed from generic and/or commodity components that are sourced from a number of $3^{rd}$ party vendors. Thus, manufacturers have historically struggled to implement an increasing set of features on embedded platforms where components are sub-optimal (e.g., low memory resources, etc.). Additionally, processor architectures have evolved to include multiple processors from multiple sources within a single device.

More recently, many extant consumer devices commonly include both an application processor as well as one or more peripheral chipsets. Furthermore, these disparate processors have evolved towards the use of a shared memory mapped bus interface. As a result of this evolution, peripheral chipsets commonly have access to host memory (e.g., random access memory (RAM) technologies including dynamic RAM (DRAM)). Accordingly, when a peripheral chipset attempts to access an illegal address in host memory, it can result in various violations which ultimately can result in, for example, kernel panic situations thus resulting in undesirable device operation such as, for example, a reboot of the entire system.

Over time, it has been determined that the logging of these violations (e.g., in kernel panic logs) are not always adequate in determining the root cause or issue which resulted in the undesirable device operation. To these ends, improved methods and apparatus are needed for hardware solutions that guard against illegal host memory accesses, thereby improving upon perceived product quality as well as improving upon user experiences with these devices.

SUMMARY

The present disclosure satisfies the foregoing needs by providing, inter alia, methods and apparatus for guarding against illegal host memory accesses.

In a first aspect, a method for providing access to a shared memory resource is disclosed. In one embodiment, the method includes: generating, by a first processor, a first window register associated with the shared memory resource; and transmitting the first window register from the first processor to a second processor, the first window register defining a first extent of address space within the shared memory resource that is directly accessible by the second processor without requiring a performance of arbitration operations by the first processor.

In a first variant, the generation of the first window register includes generating, by the first processor, a base address that corresponds to a starting location within the shared memory resource; and generating, by the first processor, a window length that corresponds to the first extent of address space within the shared memory resource from the starting location within the shared memory resource.

In another variant, the generation of the window register comprises generating the window register upon occurrence of a predefined event.

In yet another variant, the predefined event includes a second processor boot process.

In yet another variant, the method further includes generating, by the first processor, a second window register associated with the shared memory resource; and transmitting the second window register from the first processor to the second processor, the second window register defining a second extent of address space within the shared memory resource that is directly accessible by the second processor without requiring the performance of arbitration operations by the first processor.

In yet another variant, responsive to an attempt to access an extent of address space outside of the extent of accessible address space, receiving a nullified packet transmitted by the second processor.

In yet another variant, the reception of the nullified packet by the first processor, further includes receiving an inverted data link layer cyclic redundancy check (LCRC) value for the nullified packet.

In yet another variant, the method further includes upon reception of the nullified packet by the first processor, disregarding the nullified packet.

In a second aspect, a method for registering access violations of host memory is disclosed. In one embodiment, the method includes receiving one or more window registers defining an extent of address space within the host memory that is accessible by a peripheral processor from a host processor; responsive to an attempt to access an extent of address space outside of the extent of accessible address space, generating an error message by the peripheral processor; storing the error message within a violation register; and preventing access of the host memory by the peripheral processor until the host processor has cleared the error message.

In one variant, the generation of the error message includes: generating a memory address for the extent of address space outside of the extent of accessible address space; generating a source for the attempt to access the extent of address space outside of the extent of accessible address space; and generating a violation type for the attempt to access the extent of address space outside of the extent of accessible address space.

In another variant, the method includes the generation of the violation type that includes determining whether an access violation comprises a write violation or a read violation.

In yet another variant, the generation of the source includes determining one of a direct memory access (DMA) unit or a central processing unit (CPU) as the source of an illegal access attempt.

In yet another variant, the generation of the memory address includes: determining whether a start address for the memory address falls outside the extent of accessible address space; and determining whether an end address for the memory address falls outside the extent of accessible address space.

In yet another aspect, the prevention of access to the host memory includes: generating a nullified packet by the peripheral processor; and transmitting the nullified packet to the host processor.

In yet another aspect, the generation of the nullified packet by the peripheral processor further includes generating an inverted data link layer cyclic redundancy check (LCRC) value for the nullified packet.

In a third aspect, a method for handling detected violations of host memory is disclosed. In one embodiment, the method includes detecting a violation of access of a defined extent of address within host memory; storing a violation message within a violation register; and transmitting a nullified packet in response to the detection of the violation.

In a fourth aspect, a memory mapped system is disclosed. In one embodiment, the memory mapped system includes a host processor and one or more peripheral processors. In a variant, the memory mapped system is configured to register access violations of host memory. In another variant, the memory mapped system is configured to handle detected violations of host memory.

In a fifth aspect, host memory access protection registers are disclosed. In one embodiment, the host memory access protection registers includes a window register, a window configuration register and a violation register.

In a sixth aspect, a computer readable medium is disclosed. In one embodiment, the computer readable medium includes a non-transitory storage medium having one or more computable executable instructions stored thereon, the one or more instructions when executed configured to: receive one or more window registers defining an extent of address space within a host memory that is accessible by a peripheral processor from a host processor; generate an error message responsive to an attempt to access an extent of address space outside of the extent of accessible address space; store the error message within a violation register; and prevent access of the host memory by the peripheral processor until the host processor has cleared the error message.

In a seventh aspect, a peripheral processor is disclosed. In one embodiment, the peripheral processing device is configured to access host memory within a memory mapped system and includes: a peripheral CPU, a peripheral MMU, peripheral memory and a peripheral direct memory access (DMA) unit and further includes logic configured to: receive a first window register from a host processing device, the first window register defining a first extent of address space within the host memory resource that is directly accessible by the peripheral processing device without requiring a performance of arbitration operations by the host processing device.

In one variant, the peripheral processing device further includes logic configured to: expose a capability register which the host processing device can access, the capability register comprising a windows enabled field and a windows available field.

In yet another variant, the peripheral processing device further includes logic configured to: write a first value into the windows available field, the first value comprising a maximum number of windows supported by the peripheral processing device.

In yet another variant, the peripheral processing device further includes logic configured to: read a second value from the windows enabled field, the second value indicating to the peripheral processing device a number of windows enabled by the host processing device.

In another embodiment, the peripheral processor is configured to register access violations of host memory within a memory mapped system, the peripheral processing device further including a peripheral CPU, a peripheral MMU, peripheral memory and a peripheral direct memory access (DMA) unit and further comprising logic configured to: receive one or more window registers defining an extent of address space within the host memory that is accessible by the peripheral processor from a host processor; generate an error message responsive to an attempt to access an extent of address space outside of the extent of accessible address space; store the error message within a violation register; and prevent access of the host memory by the peripheral processor until the host processor has cleared the error message.

In one variant, the prevention of access to the host memory includes the generation of a nullified packet by the peripheral processor and transmission of the nullified packet to the host processor.

In another variant, the generation of the nullified packet by the peripheral processing device further includes generation of an inverted data link layer cyclic redundancy check (LCRC) value for the nullified packet.

In yet another variant, the generation of the error message includes a generation of a memory address for the extent of address space outside of the extent of accessible address space; a generation of a source for the attempt to access the extent of address space outside of the extent of accessible address space; and a generation of a violation type for the attempt to access the extent of address space outside of the extent of accessible address space.

In yet another variant, the generation of the source includes the determination of one of the peripheral DMA or the peripheral CPU as the source of an illegal access attempt.

In an eighth aspect, a host processor is disclosed. In one embodiment, the host processor is configured to define one or more window registers containing the extent of address space within a host memory that is accessible by a peripheral processing device; and transmit the one or more window registers to the peripheral processing device.

In one variant, the one or more window registers is defined by the host processor during a boot process for the memory mapped system.

In another variant, each of the one or more window registers comprises both a base address and a window length, the base address and the window length configured to define an address space within the host memory that are to be accessible by the peripheral processing device.

In yet another variant, the memory mapped system further includes a window configuration register, the window configuration register configured to be read and/or written by the host processor and the peripheral processing device.

In yet another variant, the window configuration register further includes an available window field and the peripheral processing device is further configured to write a value into the available window field; and wherein the host processor is further configured to read the value in the available window field, the read value being utilized by the host processor in order to determine whether the host processor should write a value to a windows enabled field of the window configuration register.

In yet another variant, the host processor is further configured to write a default value to the windows enabled field of the window configuration register, the default value being indicative of a legacy peripheral processing device that is incompatible with support of the one or more window registers.

In yet another variant, the host processor is further configured to write to one or more locking bits of the window configuration register, the one or more locking bits configured to prevent the update of any fields located within the one or more window registers.

In a ninth aspect, a computing device is disclosed. In one embodiment, the computing device includes a host processing device comprising a host CPU and a host memory management unit (MMU); a peripheral processing device comprising a peripheral CPU, a peripheral MMU, peripheral memory and a peripheral direct memory access (DMA) unit; and a host memory accessible by both the host processing device and the peripheral processing device. The host processing device further includes logic configured to: generate a first window register associated with the host memory; and transmit the first window register from the host processing device to the peripheral processing device, the first window register defining a first extent of address space within the host memory that is directly accessible by the peripheral processing device without requiring a performance of arbitration operations by the host processing device.

In one variant, the host processing device further includes logic configured to prevent access of the first extent of address space within the host memory by the host processing device.

In another variant, the first window register is defined by the host processing device during a boot process for the memory mapped system.

In yet another variant, the first window register includes both a base address and a window length, the base address and the window length configured to define the first extent of address space within the host memory.

In yet another variant, the memory mapped system further includes a window configuration register, the window configuration register configured to be read and/or written by the host processing device and the peripheral processing device.

In yet another variant, the window configuration register further includes an available window field and the peripheral processing device is further configured to write a value into the available window field; and the host processing device is further configured to read the value in the available window field, the read value being utilized by the host processing device in order to determine whether the host processing device should write a value to a windows enabled field of the window configuration register.

In yet another variant, the host processing device is further configured to write a default value to the windows enabled field of the window configuration register, the default value being indicative of a legacy peripheral processing device that is incompatible with support of the one or more window registers.

In yet another variant, the host processing device is further configured to write to one or more locking bits of the window configuration register, the one or more locking bits configured to prevent the update of any fields located within one or more window registers.

In another embodiment, the computing device includes a memory mapped system and further includes a host processing device having a host CPU and a host memory management unit (MMU); a peripheral processing device having a peripheral CPU, a peripheral MMU, peripheral memory and a peripheral direct memory access (DMA) unit; and a host memory accessible by both the host processing device and the peripheral processing device. The peripheral processing device further comprises logic configured to: receive one or more window registers defining an extent of address space within the host memory that is accessible by the peripheral processing device from the host processing device; generate an error message responsive to an attempt to access an extent of address space outside of the extent of accessible address space; store the error message within a violation register located within the peripheral memory; and prevent access of the host memory by the peripheral processing device until the host processing device has cleared the error message.

In another embodiment, the computing device includes a memory mapped system, and further includes: a host processing device; a peripheral processing device; and a host memory accessible by both the host processing device and the peripheral processing device. The peripheral processing device is configured to: detect an access violation outside of a defined extent of address space within the host memory; in response to the detected access violation, transmit a nullified packet to the host processing device; store a violation message within a violation register; while the violation message has not been cleared, prevent transmission of one or more data packets by the peripheral processing device to the host processing device; and responsive to the violation message being cleared, enable transmission of the one or more data packets to the host processing device by the peripheral processing device.

In another aspect, a peripheral processor apparatus is disclosed. In one embodiment, the peripheral processor apparatus is for use in a system that includes the peripheral processor apparatus and a host processor apparatus, and the peripheral processor apparatus is configured to: detect an access violation outside a defined extent of address space within host memory; in response to the detected access violation, transmit a nullified packet to the host processor apparatus; transmit a violation message to a violation register; and responsive to the violation message being cleared, cause transmission of one or more data packets to the host processor apparatus.

Other features and advantages of the present disclosure will immediately be recognized by persons of ordinary skill in the art with reference to the attached drawings and detailed description of exemplary embodiments as given below.

All Figures © Copyright 2015-2016 Apple Inc. All rights reserved.

DETAILED DESCRIPTION

Reference is now made to the drawings, wherein like numerals refer to like parts throughout.

DETAILED DESCRIPTION OF EXEMPLARY EMBODIMENTS

Exemplary embodiments of the present disclosure are now described in detail. While these embodiments are primarily discussed in the context of detecting and registering host memory access violations by peripheral chipset manufacturers, it will be recognized by those of ordinary skill that the present disclosure is not so limited. In fact, the various aspects of the disclosure are useful for detecting and registering host memory access violations by the applications processor. Further, while the following embodiments describe specific implementations of e.g., dedicated address spaces, dedicated violation registers, and specific protocols, those of ordinary skill in the related arts will readily appreciate that such descriptions are purely illustrative of the broader principles described herein.

Moreover, while embodiments described herein are primarily discussed in the context of an inter-processor communication (IPC) link, it will be recognized by those of ordinary skill that the present disclosure is not so limited. In fact, the various aspects of the disclosure are useful in any device or network of devices that may benefit from providing memory access protection for memory-mapped architectures, as is disclosed herein. Further, while the following embodiments describe specific implementations of e.g., dedicated address spaces, legacy support capabilities, and specific protocols, those of ordinary skill in the related arts will readily appreciate that such descriptions are purely illustrative.

Exemplary Processor and Memory Architecture—

Figure 1:
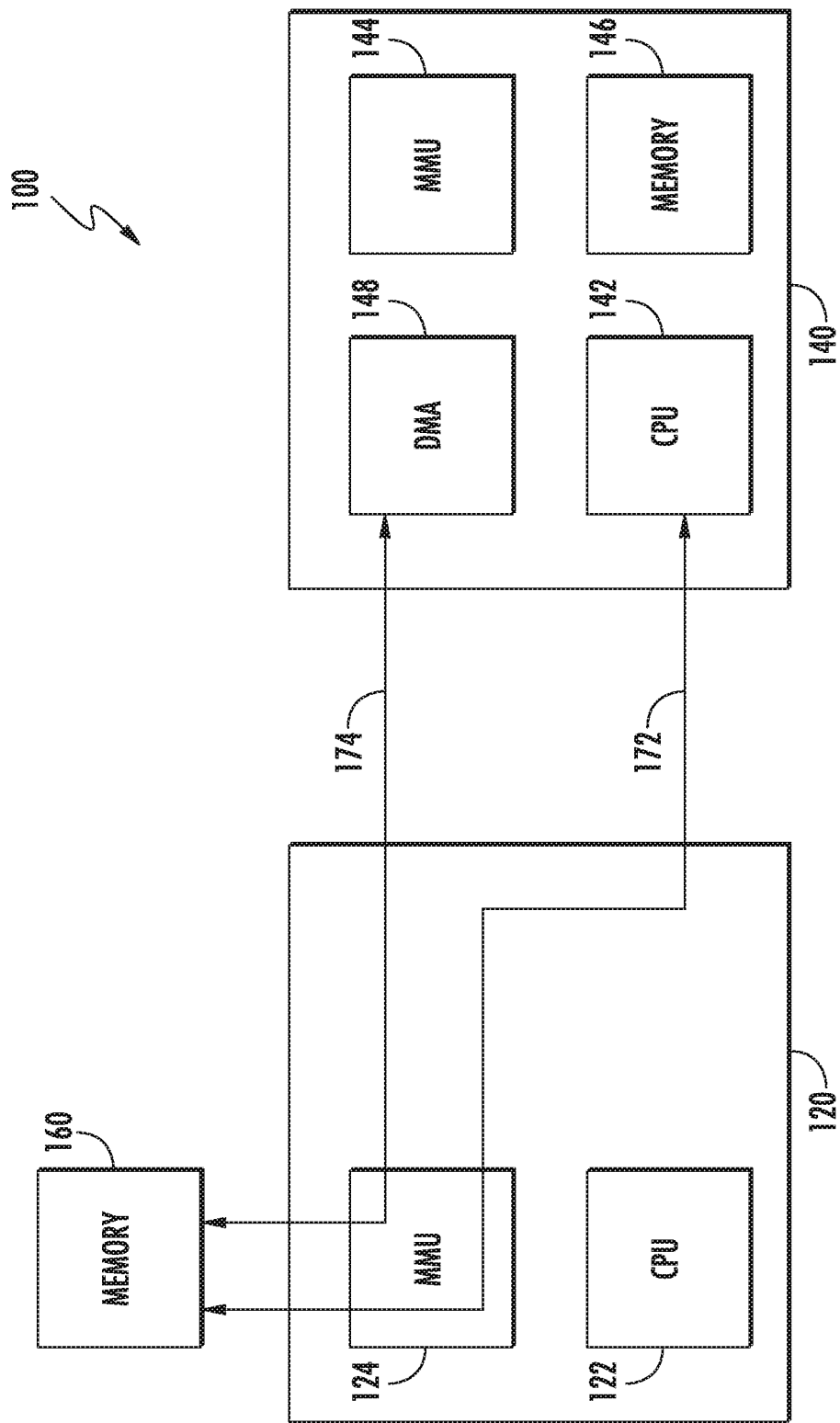
FIG. 1 is a system block diagram illustrating various basic building blocks associated with a memory mapped system in accordance with the principles of the present disclosure.

Referring now to FIG. 1, an exemplary memory mapped system 100 is shown and described in detail. The memory mapped system 100 may be included in any number of consumer electronic devices including, for example, smart phone devices (such as, without limitation, the iPhone), personal media devices (such as, without limitation, the iPad/iPod), personal computing devices (such as, without limitation, the MacBook Pro and MacBook Air) and literally any other computing device having a host processor, one or more peripheral processors, and a shared memory. Artisans of ordinary skill in the related arts will readily appreciate that memory-mapped architectures may be beneficial to increase performance speeds and/or to optimize operation between processors. However, memory-mapped architectures may also introduce unexpected problems, for example when a first processor behaves unexpectedly, the first processor could directly write into the memory space of the second processor, thereby corrupting the second processor's operation, etc.

The system includes, in the illustrated embodiment, host memory 160 which may include either volatile (e.g., DRAM, etc.) or non-volatile memory (e.g., non-volatile RAM (NVRAM), etc., as well as a host processor 120 (e.g., an applications processor (AP)) and a peripheral processor 140 or peripheral chipset. The following discussions will be described in reference to a "host" processor, and a "peripheral" (or "peripheral device") processor. For reasons which will become apparent below, it is appreciated that the designation as to host or peripheral processor is used to simplify and/or clarify the following explanations, and does not imply existing host or peripheral functionality, or that such roles cannot be reversed.

While illustrated in the context of a system having a single host processor and a single peripheral processor, it is readily appreciated that embodiments are envisioned herein that include additional processing chipsets (e.g., additional peripheral processors). The host processor 120 includes a central processing unit (CPU) 122 as well as a memory management unit (MMU) 124 in the illustrated embodiment, while the peripheral processor 140 includes a CPU 142, a MMU 144 as well as memory 146 and a direct memory access (DMA) unit 148. As is shown, the peripheral processor can access host memory 160 via a CPU access over a first communications link 172 or via DMA access over a second communications link 174.

Figure 1A:
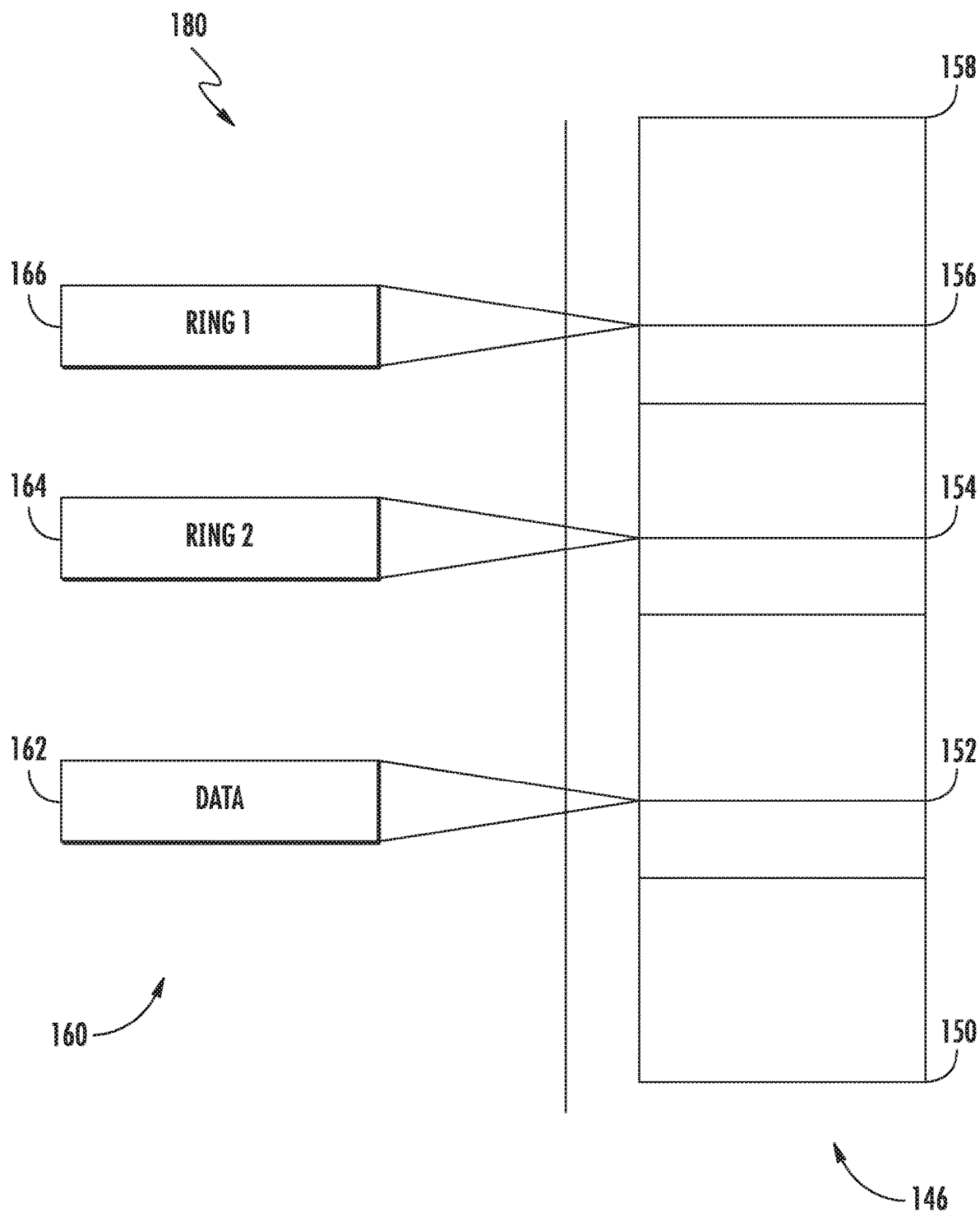
FIG. 1A is a block diagram illustrating host memory as seen by a peripheral processor in accordance with the principles of the present disclosure.

In one exemplary embodiment, host memory 160 is accessible to the peripheral processor via a peripheral memory map representation 146, as shown in FIG. 1A. Host software defines several data structures (e.g., ring data structures 164, 166, data structures 162, etc.) within the host memory and updates peripheral memory/registers with the addresses of these data structures. The peripheral processor then maps these address ranges at various base addresses in its own memory map 146. For example, and as illustrated in FIG. 1A, peripheral memory 146 includes a starting address 150 (e.g., 0x0000000000000000) as well as an end address 158 (e.g., 0xFFFFFFFFFFFFFFFF). Within this peripheral memory, several base addresses have been allocated for, and correspond to, data structures contained within host memory. For example, base address 152 refers to data structure 162 within host memory; base address 154 refers to ring structure 164 within host memory; while base address 156 refers to ring structure 166 within host memory. By defining these base addresses in peripheral memory, the peripheral processor CPU 142 or DMA 148 may directly access these data structures (e.g., without requiring the host processor to perform arbitration operations) using communication links 172, 174, respectively. While the peripheral processor in FIG. 1 is illustrated as having access to host memory via CPU 142 or DMA 148, it is appreciated that more access pathways (e.g., via the addition of an additional DMA unit, etc.) or less (e.g., via only the CPU) are also readily envisioned.

In one exemplary implementation, the peripheral processor maps these data structures as part of the peripheral boot process, although it is appreciated that the memory mapping between data structures in host memory and peripheral memory can occur at during normal operation. For example, firmware and/or software applications may dynamically allocate and/or de-allocate memory windows between the host and peripheral processors so as to facilitate data transactions with minimal overhead. Common examples of memory mapped access include without limitation, e.g., device driver allocations, mailbox allocations, bulk memory transfers, etc.

HMAP Registers—

Exemplary embodiments of the HMAP registers are now described in detail. While these embodiments are primarily discussed in the context of being stored within dedicated hardware registers, it will be recognized that the present disclosure is not so limited. For example, artisans of ordinary skill in the related arts, given the contents of the present disclosure, will readily appreciate that register locations may be virtualized and/or mapped to memory locations within e.g., the peripheral memory management unit (MMU) 144, the host MMU 124, the peripheral memory 146, and/or the host memory 160, etc. In fact, the various HMAP registers described herein may be stored anywhere within the memory mapped system 100 with equivalent success.

Additionally, while primarily discussed in the context of a specific ordering for fields located within individual ones of these HMAP registers, it is appreciated that the specific ordering of these fields is not important. For example, and referring to FIG. 2C, while the HMAP violation register 240 is described in the context of having the violation type field 246 and violation source field 248 resident next to one another within this HMAP violation register, it is appreciated that the specific ordering of these fields within a given register may be modified. These and other embodiments would be readily appreciated by one or ordinary skill given the contents of the present disclosure.

Figure 2A:
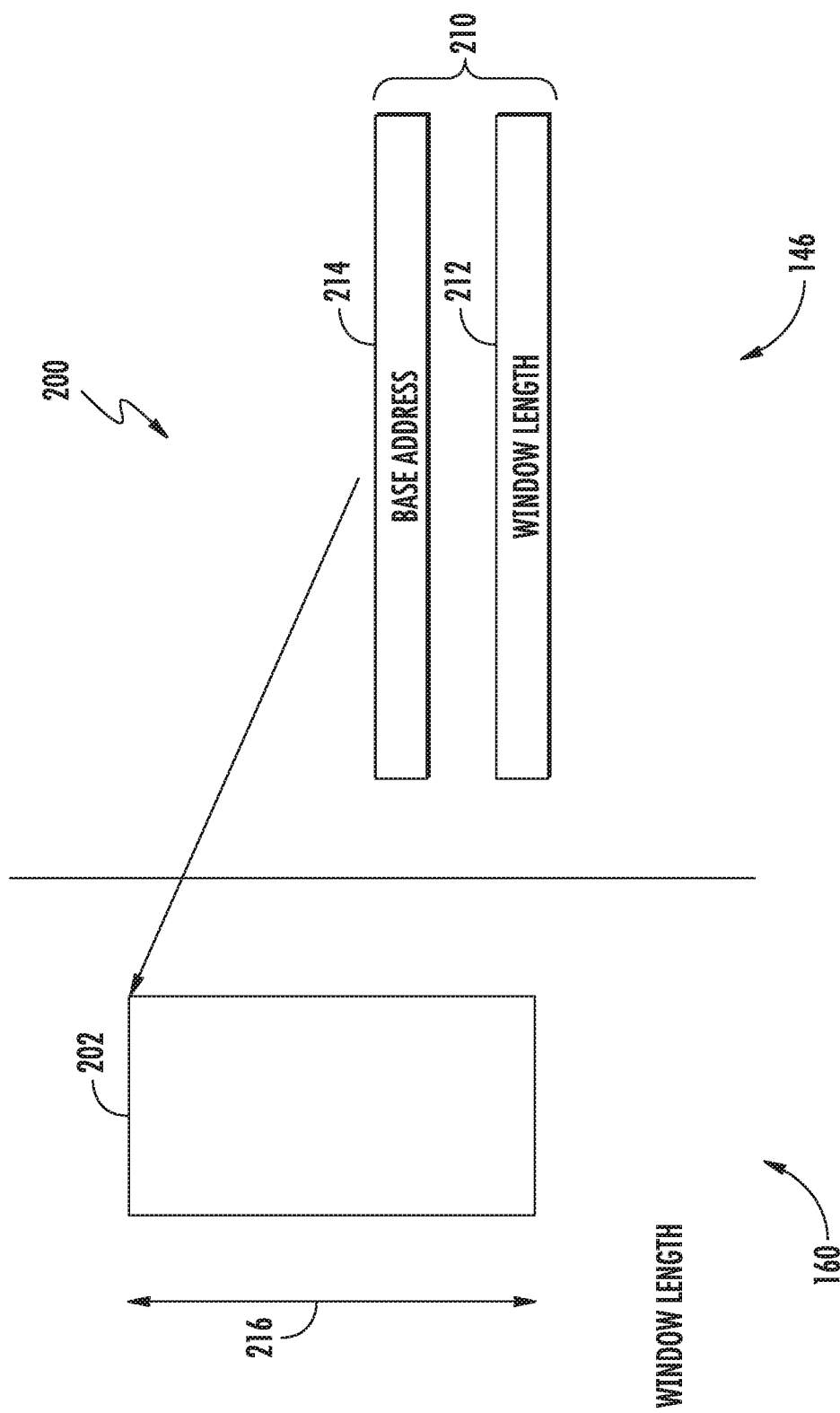
FIG. 2A is a block diagram illustrating a host memory access protection (HMAP) window register for use with the memory mapped system illustrated in FIG. 1.

Referring now to FIG. 2A, an exemplary implementation for an HMAP windowing system 200 is shown and described in detail. For example, upon a predefined event (e.g., during the boot process for the memory mapped system 100, a boot process for the peripheral processor, a boot process for the host processor, etc.), the host software determines what locations in host memory 160 will become accessible to the peripheral processor by writing to so-called HMAP window register(s) 210. For example, in one exemplary embodiment, the peripheral processor exposes "N" number of 128-bits' of HMAP window register space. Each of these HMAP window registers 210 consists of a base address 214 that corresponds to a base address 202 in host memory 160. Moreover, each of these HMAP window registers consists of a window length 212 that corresponds to a window length 216 of host memory accessible by the peripheral. By exposing these HMAP window registers to host software, host software can define the extent of host memory accessible to the peripheral processor.

Optionally, or alternatively, the peripheral software alone or in combination with the host software, may define what locations in host memory are accessible by writing to these HMAP window registers. For example, in some embodiments, the peripheral chipset may implement even stricter host memory access windows than the host's default settings. Stricter windowing can further minimize accesses to the host memory in the event of a trap or crash. In this manner, the peripheral software can guarantee that no host memory would be touched by any DMA engines subsequent to the trap or crash. In another example, the peripheral chipset may require more memory than the host has provided; in such cases, the peripheral may request more memory (and responsively the host may determine how much (if any) additional memory can be allocated to the peripheral). Still other variants may be implemented with equivalent success by artisans of ordinary skill in the related arts, given the contents of the present disclosure.

In the context of an exemplary 128-bit implementation, the first 64-bits of the HMAP window register define the base address 202 for an accessible portion of host memory. In one or more implementations, the base address is aligned to 4K for easier hardware implementation. In some embodiments, the HMAP window registers can only be written by the host processor; in other embodiments, the HMAP window registers may also be written by the peripheral processor, or alternatively, only be written via the peripheral processor. In implementations in which the base address field 214 can only be written by one of the processors (e.g., the peripheral or the host), mechanisms for identifying improper write attempts to the HMAP window register fields can be flagged and logged (see the discussion of the HMAP violation registers discussed infra).

The following 32-bits (i.e., the window length field 212) are reserved for defining the window length 216 of accessible space in host memory. Similar to the discussion of the base address field 214, the window length field can be defined by host software running on the host processor and optionally, or alternatively, be defined by peripheral software running on the peripheral processor. In one or more implementations, the window size defined by the window length field 212 will only occur in multiples of 512-bytes in order to facilitate easier hardware implementation. As the length of the window length field in this example embodiment is 32-bits, the largest window length in host memory is defined as $2^{32}$ bits in length minus a reset value that is defined in an exemplary implementation as '0' (i.e., a maximum window length of 4,294,967,295 within the 128-bit host memory space). The use of a set reset value (e.g., zero (0)) enables, inter alia, the HMAP window register to be updated and/or reset. For example, by setting the window length field 212 to '0', the base address field 214 can be subsequently updated and a new window length field 212 can be set.

As a brief aside, the aforementioned embodiments use a 4K alignment for the base and require window sizes to be a multiple of 512-bytes so as to allow the hardware implementation to ignore the low 9 bits of an address when checking whether it falls within a window. The exemplary sizes are selected to optimize a specific hardware implementation (e.g., the hardware check can be performed faster and/or manufactured more cheaply). A person having ordinary skill in the related arts, given the contents of the present disclosure, may readily apply the principles described herein to implementations with different alignments, window sizes and/or addressing schemes, the foregoing being purely illustrative.

Figure 2B:
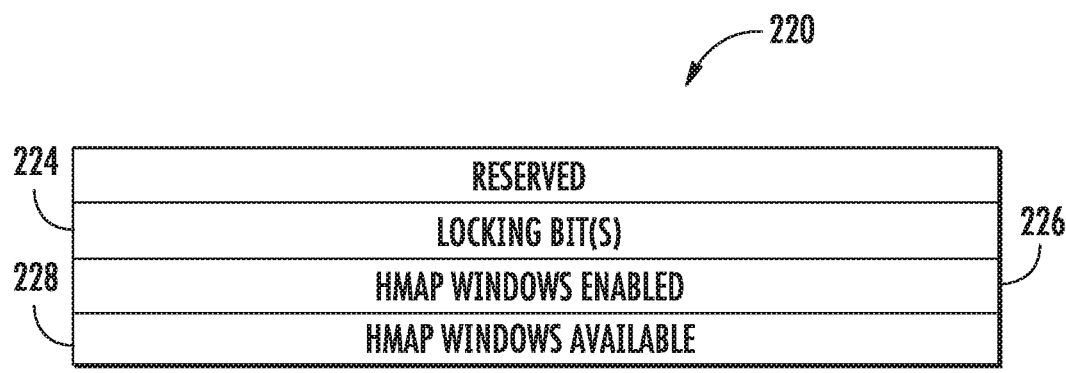
FIG. 2B is a block diagram illustrating a HMAP window configuration register for use with the memory mapped system illustrated in FIG. 1.

Referring now to FIG. 2B, an exemplary implementation for an HMAP window configuration register 220 is shown and described in detail. In one exemplary implementation, various portions of the HMAP window configuration register 220 can be read and/or written by the host and peripheral processors. In one exemplary embodiment, the peripheral hardware can set the maximum number of HMAP windows that are supported/available by writing to the HMAP available window field 228. The host processor can read the HMAP available window field 228 register, and decide whether to enable windows and/or how many windows to enable. The host software can enable a number of HMAP windows by writing to the HMAP windows enabled field 226. In some cases, a default value of '0' means that HMAP window registers are not used, or alternatively, that this feature is disabled, in order to keep the hardware compatible with software implementations that don't support HMAP functionality. The HMAP window configuration register also includes a locking bit(s) field 224. The purpose of this locking bit(s) field is to freeze the state of the HMAP windows register 210 in order to prevent the updating of any of the fields located within these HMAP windows register(s).

In the context of an exemplary 32-bit implementation for the HMAP window configuration register 220, the first 8-bits are reserved for the so-called HMAP windows available field 228. In one embodiment, the peripheral processor defines the number of windows that are available, while the host processor accesses this register field 228 in order to determine the number of windows currently available. The following 8-bits are reserved for the so-called HMAP windows enabled field 226. In one embodiment, the host processor writes this register in order to program the number of windows that have been enabled by the host processor. Moreover, by specifying a reset value of, for example, '0', this enables the peripheral processor (and the host processor) to determine when the HMAP window register functionality has been disabled. The following bit indicates the locking bit field 224 for the HMAP window configuration register. For example, in one embodiment, a value of '1' within this locking bit field 224 indicates to the peripheral processor that any attempted writes to the HMAP window register 210 is an error. In other words, the purpose of the locking bit field is to freeze the state of the programmed window registers 210 and trap any further accesses. In one or more implementations, the host processor has exclusive access to change the value of this field in order to ensure that it has exclusive control over the creation/modification of HMAP window registers 210.

Figure 2C:
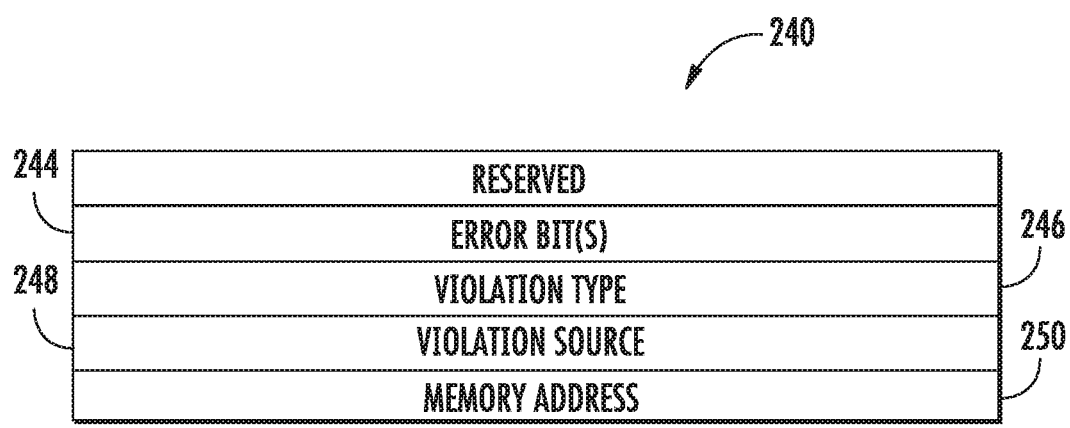
FIG. 2C is a block diagram illustrating a HMAP violation register for use with the memory mapped system illustrated in FIG. 1.

Referring now to FIG. 2C, an exemplary implementation for an HMAP violation register 240 is shown and described in detail. Since one exemplary purpose of these HMAP registers 210, 220, 240 is to protect against and identify illegal access to host memory 160, these registers may be designated for specific use or common use. More directly, while the present disclosure describes a single set of registers that control and configure a common set of window ranges, it is readily appreciated that in other embodiments, multiple distinct sets of registers may be used to specify controlled ranges for different software applications etc. In other words, if a peripheral device has multiple DMA units and/or multiple CPUs, the various DMA units and/or CPUs may have differing constraints consistent with different window configuration registers.

In one exemplary implementation, once host software has enabled the HMAP window registers, the peripheral processor detects HMAP violations and updates the HMAP violation register whenever an access is made to host memory that is outside of the defined protected range. More directly, the peripheral processor can readily monitor its own transactions; transactions that fall outside the defined protected range are assumed to be errant accesses due to corrupted software execution, etc. In this manner, error detection and recovery can be handled and prevented directly by the peripheral processor (rather than the host processor which is unaware of the peripheral processor's independent operation).

Moreover, in one or more embodiments, the peripheral processor will not generate any bus-level packets when it detects a violation until the detected violation is later cleared by the host processor. Violations are flagged for the host processor within the HMAP violation register. The HMAP violation register consists of a number of fields including a memory address field 250, a violation source field 248, a violation type field 246, an error bit(s) field 244.

In the context of an exemplary 128-bit implementation for the HMAP violation register 240, the memory address field 250 consists of 64-bits that are indicative of the memory address of host memory that was caught during an attempted access outside of the range of addresses defined by the HMAP window registers. The subsequent 16-bits represent the violation source field 248 which defines the source of the attempted access violation. For example, in one exemplary implementation, a value of '1' is indicative of an attempted rewrite of a window register 210 when the locking bit(s) field 224 of the HMAP configuration register 220 is set to a 'locked' state. Moreover, a value of '2' is indicative of a violation by the peripheral processor CPU; a value of '3' is indicative of a violation by a first DMA unit; a value of '4' is indicative of a violation by a second DMA unit and so forth. More bits can be defined by the vendor of the peripheral processor in order to precisely define which unit (e.g., CPU, DMA, etc.) of the peripheral processor caused the memory violation/illegal access attempt. For example, this field can be modified so as to capture other implementation-specific identifiers such as an exemplary Advance eXtensible identifier (AXID), etc.

The violation type field 246 is utilized to identify the type of violation that has occurred. For example, in the context of an exemplary '1' bit field length for the violation type field 246, a value of '0' can be used to signify a read violation of the host memory, while a value of '1' can be used to signify a write violation of the host memory. The error bit(s) field 244 is utilized in order to determine the number of errors detected. For example, in the context of an exemplary '2' bit field length for the error bit(s) field, a value of '00' indicates no errors; a value of '01' indicates a single violation that has been detected by the peripheral; a value of '11' indicates that multiple violations were detected (e.g., the detection of both a read and a write violation to the same memory address, etc.). In one exemplary embodiment, the value of '10' is unused as there is no need to track any additional types of errors within the error bit(s) field. In other embodiments, the value of '10' may be used to track other types of errors, statuses, or conditions (e.g., internal errors, successful recovery, internally hung/unknown state, etc.) Exemplary implementations for the HMAP window register 210; the HMAP window configuration register 220; and the HMAP violation register 240 are included within APPENDIXES A, B and C, respectively.

In one embodiment, the peripheral processor exposes the HMAP window register 210, the HMAP window configuration register 220, and the HMAP violation register 240 to the host processor via a configuration space. By allowing these registers to be located within a configuration space, the host processor has the ability to write to these registers as early as possible during the boot process of the peripheral processor as part of, for example, the Peripheral Component Interconnect Express (PCIe) enumeration process. Moreover, the updating of the HMAP registers dynamically can result in race condition (i.e., when both processors attempt to update the registers at the same time, resulting in an unknown condition). Hence, mechanisms to update these registers may be defined by a specific protocol or other alternative means so as to avoid access contention and/or race conditions. Generally speaking, it is anticipated that the host software will update the HMAP window registers once upon initial start-up, although it is appreciated that the aforementioned HMAP window registers may in certain implementations be updated on a dynamic basis.

Finally, it is appreciated that within the context of PCIe, transaction layer packets (TLP) contain a maximum packet size (MPS) as a number of bytes. Accordingly, when a given peripheral processor attempts to access host memory, the start address of a TLP may occur within a defined HMAP window register while the end address of the TLP may occur outside of the defined HMAP window register. Therefore, it is appreciated that in certain implementations both the start and end address for a given TLP should be checked to ensure that the entire memory address for a given TLP falls within a defined HMAP window. However, in alternative implementations and/or under different design constraints (e.g., performance, reduced size/silicon, etc.), a given TLP may only be checked based on the starting address of the TLP packet or some other specific transaction scenario/condition, etc. Generalized methodologies for using the aforementioned HMAP registers are now described.

Methods—

Figure 3:
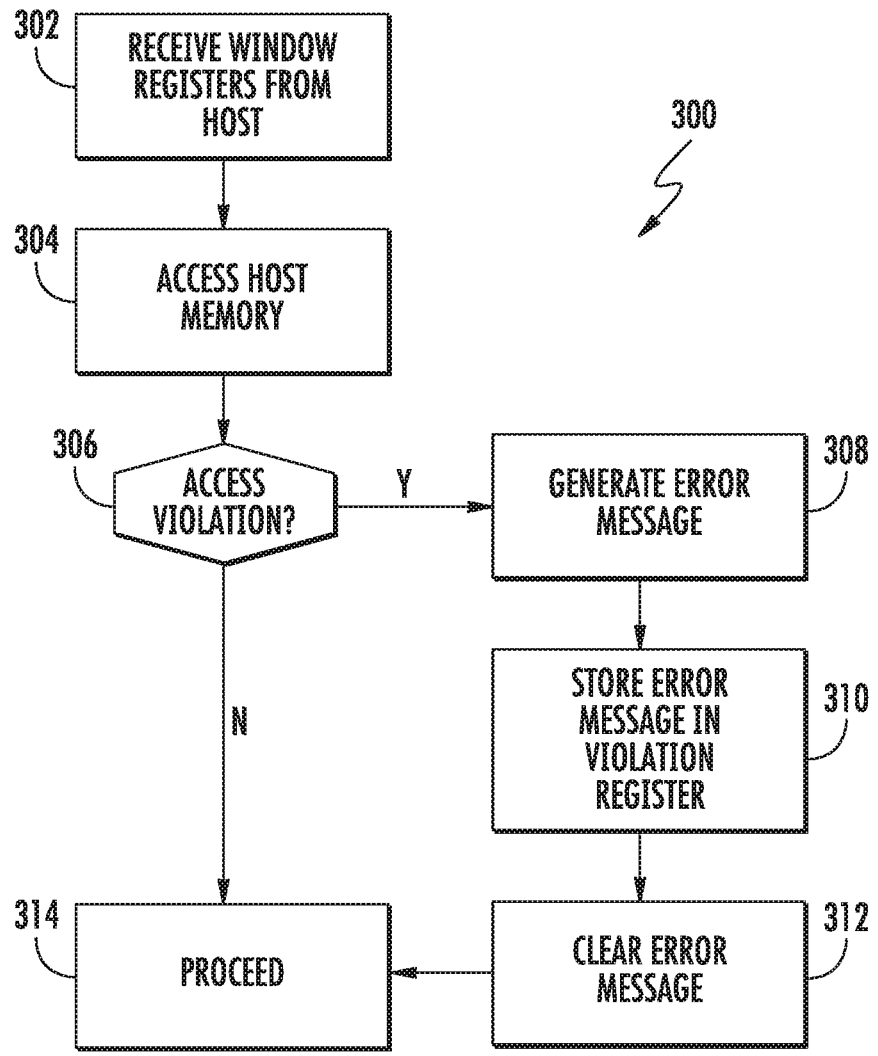
FIG. 3 is a logical flow diagram illustrating a generalized method for registering access violations of host memory in accordance with the principles of the present disclosure.

Referring now to FIG. 3, a generalized method for registering access violations of host memory 300 is illustrated. At step 302, the peripheral processor receives window registers from the host processor that are indicative of the extent of host memory that is accessible by the peripheral processor. At step 304, the peripheral processor attempts to access an address space within host memory according to normal transactions and at step 306, the peripheral processor determines whether the accessed address space violates the defined window registers received at step 302. If the access attempt does not result in an access violation, the methodology proceeds to step 314 where the host memory is accessed (e.g., a read operation, a write operation, etc.).

If however, the access attempt does result in an access violation, then the peripheral processor generates an error message at step 308. In one embodiment, this error message will include one or more of: a memory address for the violation, a source for the violation, a type of the violation (e.g., a write violation, a read violation, etc.) and/or the type of error that has occurred.

At step 310, the generated error message is stored in a violation register. In one embodiment, the violation register is of the form illustrated in FIG. 2C. Subsequent to a register access violation, the peripheral processor will not attempt to access host memory until the host processor clears the error message at step 312. After the error message has been cleared, the peripheral processor may resume operation at step 314.

Figure 4:
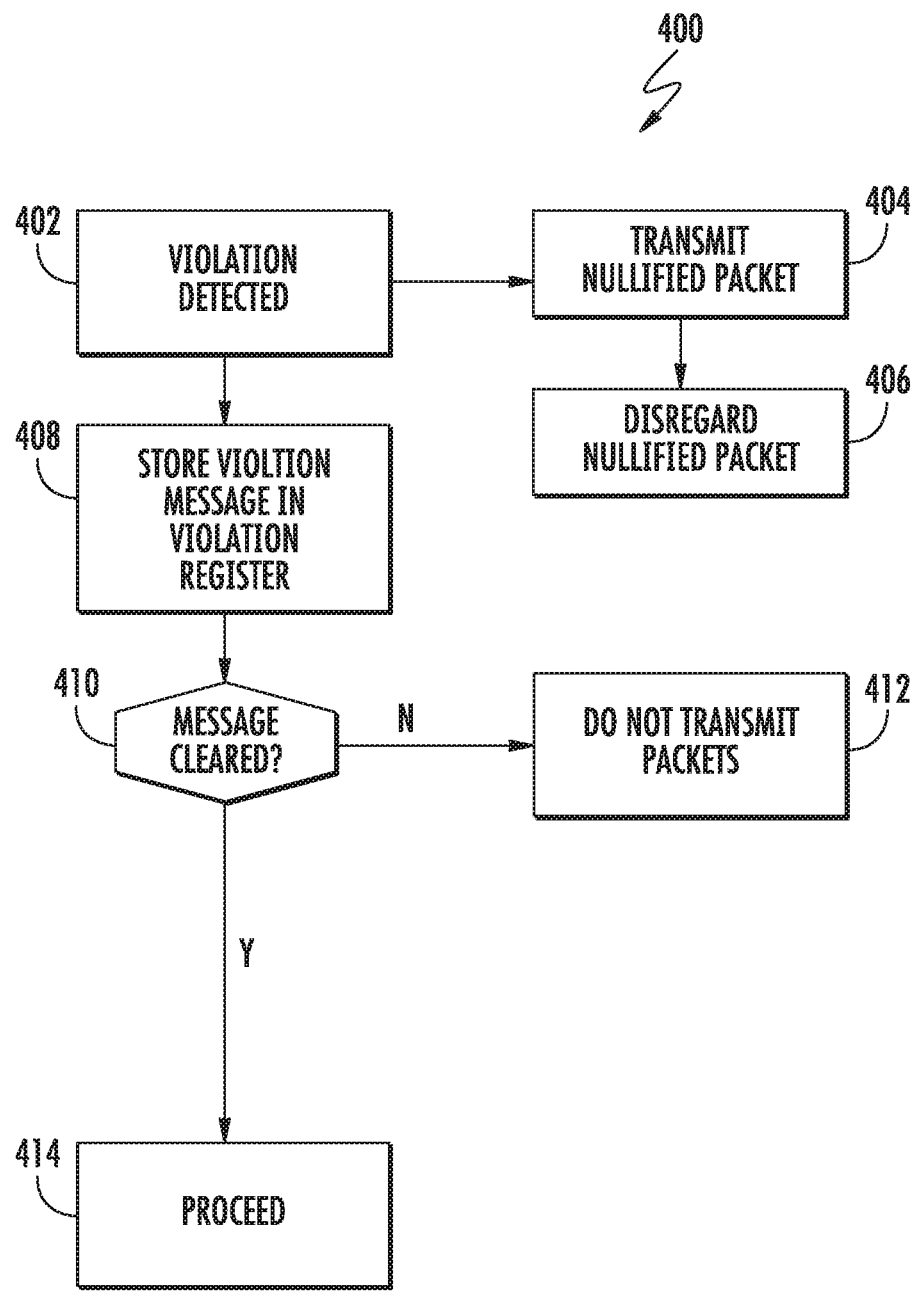
FIG. 4 is a logical flow diagram illustrating a generalized method for handling detected violations of host memory in accordance with the principles of the present disclosure.

Referring now to FIG. 4, a generalized method for handling detected violations of host memory 400 is illustrated. At step 402, an access violation is detected by the peripheral processor resulting from a violation of an address space described by the window registers. At step 404, a nullified packet is transmitted from the peripheral processor to the host. In one embodiment, the nullified packet consists of a TLP that contains an inverted data link layer cyclic redundancy check (LCRC) value. Upon receipt of this nullified packet, the host processor will disregard the nullified packet at step 406. In the exemplary context of PCIe, the packet with the inverted LCRC value will be dropped at the root complex of the host processor. In other words, the TLP will be dropped by the root complex without being flagged as an error.

Either contemporaneously with step 404, or alternatively at a time other than the transmission of the nullified packet, the peripheral processor will store a violation message within a violation register. In one embodiment, the violation register is of the form illustrated in FIG. 2C. At step 410, the violation register is checked in order to see if the violation message has been cleared and if not, the peripheral processor will not transmit any additional packets at step 412. If the violation register has been cleared at step 410, the peripheral processor will continue on at step 414.

In the exemplary context of PCIe, any subsequent TLP generation will be suspended upon the detection of a violation at step 402. As part of the error handling process, the peripheral processor will generate an internal error trap which will run a software error handler. As part of this error handling procedure, peripheral software will clear the error bits and resume peripheral processor operation. It is important that hardware operation resume normal operation so that the host software can collect debugging information if necessary without resetting/rebooting the peripheral processor. In such instances in which violations of host memory are detected, the peripheral processor is not expected to generate a link down or completion time out, etc. for detection of an address violation. Any PCIe bus level error (e.g., credit loss, etc.) are not expected upon detection of a memory access violation and the root complex at the host processor is expected to be unaware of the memory access violation. Additionally, the peripheral processor is not expected to access the link and update any host memory to report the error.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for handling detected violations of host memory by a peripheral processor apparatus, the method comprising:
   detecting an access violation associated with a defined extent of address space within the host memory;
   transmitting a nullified packet comprising an inverted data link layer cyclic redundancy check (LCRC) value to a host processor apparatus in response to the detected access violation;
   transmitting a violation message to a violation register;
   while the violation message has not been cleared, preventing transmission of one or more data packets by the peripheral processor apparatus; and
   responsive to the violation message being cleared, enabling transmission of the one or more data packets to the host processor apparatus by the peripheral processor apparatus.

2. The method of claim 1, further comprising receiving a window register from the host processor apparatus, the received window register defining the defined extent of address space within the host memory that is accessible by the peripheral processor apparatus.

3. The method of claim 1, wherein the transmitting of the nullified packet to the host processor apparatus comprises transmitting a transaction layer packet (TLP), the TLP comprising the inverted LCRC value.

4. The method of claim 1, wherein the transmitting of the violation message to the violation register occurs at a time other than the transmitting of the nullified packet.

5. The method of claim 1, wherein the transmitting of the violation message to the violation register occurs contemporaneously with the transmitting of the nullified packet.

6. The method of claim 1, further comprising enabling the host processor apparatus to collect debugging information without resetting the peripheral processor apparatus.

7. A computing device comprising a memory mapped system, the computing device comprising:
   a host processing device;
   a peripheral processing device; and
   a host memory accessible by both the host processing device and the peripheral processing device;
   wherein the peripheral processing device is configured to:
      detect an access violation outside of a defined extent of address space within the host memory;
      in response to the detected access violation, transmit a nullified packet to the host processing device;
      store a violation message within a violation register;
      while the violation message has not been cleared, prevent transmission of one or more data packets by the peripheral processing device to the host processing device; and
      responsive to the violation message being cleared, enable transmission of the one or more data packets to the host processing device by the peripheral processing device; and
   wherein the nullified packet comprises a value associated with an inverted data link layer cyclic redundancy check (LCRC).

8. The computing device of claim 7, wherein the violation register comprises one or more data fields, the one or more data fields comprising data representative of one or more of (i) a violation source, (ii) a violation type, or (iii) a memory address of the host memory that is outside the defined extent of address space.

9. The computing device of claim 7, wherein the defined extent of address space within the host memory is defined in a window register by the host processing device.

10. The computing device of claim 7, wherein the peripheral processing device is further configured to cause the host processing device to, subsequent to receipt of the nullified packet, discard the transmitted nullified packet that comprises the inverted LCRC value.

11. The computing device of claim 10, wherein the discarding of the transmitted nullified packet that comprises the inverted LCRC value by the host processing device comprises a discarding by a root complex associated with the host processing device.

12. The computing device of claim 11, wherein the discarding of the inverted LCRC value by the root complex associated with the host processing is configured to occur without being flagged as an error.

13. The computing device of claim 7, wherein the nullified packet comprises a transaction layer packet (TLP), and the TLP comprises the value associated with the inverted LCRC.

14. A peripheral processor apparatus for use in a system that comprises the peripheral processor apparatus and a host processor apparatus, the peripheral processor apparatus configured to:
   detect an access violation outside a defined extent of address space within host memory;
   in response to the detected access violation, transmit a nullified packet to the host processor apparatus;
   transmit a violation message to a violation register; and
   responsive to the violation message being cleared, cause transmission of one or more data packets to the host processor apparatus;
   wherein the transmission of the nullified packet comprises a transmission of a transaction layer packet (TLP), the TLP comprising an inverted data link cyclic redundancy check (LCRC) value.

15. The peripheral processor apparatus of claim 14, wherein:
   the peripheral processor apparatus further comprises a direct memory access (DMA) unit and the peripheral processor apparatus is further configured to access the host memory via a DMA access over a communications link.

16. The peripheral processor apparatus of claim 14, wherein the peripheral processor apparatus is further configured to:
   check the violation register to determine whether the violation message has been cleared; and
   prevent transmission of the one or more data packets until the violation message has been cleared.

17. The peripheral processor apparatus of claim 16, wherein the peripheral processor apparatus is further configured to execute an error handler, where the error handler is configured to clear error bits and resume peripheral processor operation.

18. The peripheral processor apparatus of claim 14, wherein the peripheral processor apparatus is further configured to cause the host processor apparatus to collect debug information without rebooting the peripheral processor apparatus.

19. The peripheral processor apparatus of claim 14, wherein the peripheral processor apparatus is further configured to receive a window register from the host processor apparatus, the received window register being configured to define the defined extent of address space within the host memory.

20. The peripheral processor apparatus of claim 19, wherein the detection of the access violation occurs responsive to the peripheral processor apparatus attempting to access a memory location outside the defined extent of address space within the host memory.

* * * * *